US006827857B1

(12) United States Patent
Berry

(10) Patent No.: US 6,827,857 B1
(45) Date of Patent: Dec. 7, 2004

(54) CONTROL VALVE AND WATER PURIFICATION METHOD

(75) Inventor: William J. Berry, Durham, NC (US)

(73) Assignee: Dracor, Inc., Durham, NC (US)

( * ) Notice: Subject to any disclaimer, the term of this patent is extended or adjusted under 35 U.S.C. 154(b) by 10 days.

(21) Appl. No.: 09/976,892

(22) Filed: Oct. 15, 2001

(51) Int. Cl.[7] .................................................. C02F 9/00
(52) U.S. Cl. .................. 210/663; 137/624.47; 210/805; 210/167; 210/424; 210/900; 251/309
(58) Field of Search ............................... 210/663, 805, 210/167, 254, 424, 541, 900; 137/625.46, 625.47; 251/304, 309

(56) References Cited

U.S. PATENT DOCUMENTS

| | | | | |
|---|---|---|---|---|
| 3,213,881 A | * | 10/1965 | Findlay et al. ............... | 137/596 |
| 3,276,458 A | * | 10/1966 | Iversen et al. ............... | 210/167 |
| 3,870,033 A | * | 3/1975 | Faylor et al. ................ | 210/167 |
| 4,280,912 A | | 7/1981 | Berry, III et al. ........... | 210/662 |
| 5,931,196 A | * | 8/1999 | Bernardi et al. ........ | 137/625.46 |

OTHER PUBLICATIONS

Sani–tech Sanitary Gooseneck Faucet brochure, 1 page, undated.
Laboratory Fixtures brochure, 1 page, undated.
Sani–Tech Sanitary Goosenecks and Faucets brochure, 1 page, undated.
Valves and Valve Automation Laboratory Faucets brochure, 1 page, undated.
Plastinetics, Inc. Controlled Flow All Plastics Laboratory Fixtures brochure, 1 page, undated.
Reverse Osmosis (Milli–RO Plus Systems) brochure, 2 pages, undated.
Nanopure Diamond Water Purification System brochure, 1 page, undated.
Company Water Systems (Milli–Q) brochure, 2 pages, undated.
Fluid Monitor & Control by DRACOR, Inc., brochure 4 pages, Copyright 1975.

* cited by examiner

*Primary Examiner*—Ivars C. Cintins

(57) ABSTRACT

The present invention consists of an apparatus and method for supplying purified water to a faucet or other apparatus for use from a purification loop maintaining water in constant motion. The apparatus allows the user to select and withdraw the amount of water needed in a closely controlled fashion while any unused water remains in the loop where it is continually purified. A control valve with a manually rotatable spool permits the purified water to be adjustably tapped or withdrawn for various end uses.

13 Claims, 3 Drawing Sheets

CONTROL VALVE AND WATER PURIFICATION METHOD

FIELD OF THE INVENTION

The invention herein pertains to water purification using ion exchange resins and particularly pertains to a continuous loop purification method using a control valve for selective purified water withdrawal.

DESCRIPTION OF THE PRIOR ART AND OBJECTIVES OF THE INVENTION

Water is considered highly purified when it has a minimal electrical resistance of 18 meg ohms per centimeter at 25° C. Water of such high purity can easily become contaminated and therefore circulation through a loop has frequently been used with various devices such as laboratory faucets and the like. Constant circulation insures purity while preventing stagnation which accommodates bacterial growth. High purity water is of vital importance in today's manufacturing plants that produce electronic circuitry, chips and other high tech components and equipment. Also, high purity water is a must in kidney dialysis and many other medical procedures. Thus, while it is not difficult to produce 18 meg ohms water, it is difficult to constantly maintain this purity over long periods of time for use on an "as needed" basis.

Based on the constant need for high purity water, the present invention was conceived and one of its objectives is to provide a continuous loop purification method which will allow the user to tap as much or as little 18 meg ohms water as needed for a particular application.

It is still another objective of the present invention to provide a water purification method which provides water of high purity in a continuous loop using ultraviolet light and ion exchange.

It is yet another objective of the present invention to provide a control valve to allow high purity-water to be selectively withdrawn therefrom without contaminating the remaining water.

It is also an objective of the present invention to provide a control valve which provides a manually operated spool which is both simple to use and inexpensive to manufacture and distribute.

Various other objectives and advantages of the present invention will become apparent to those skilled in the art as a more detailed description is set forth below.

SUMMARY OF THE INVENTION

The aforesaid and other objectives are realized by providing a continuous water purification loop having a manually operable control valve therein. The control valve allows the user to withdraw a selected amount of the highly purified water as the water circulates. The control valve includes a handle for manual manipulation of a central spool residing in a duct within the valve housing. The duct has a series of axially spaced, parallel grooves therealong with O-rings therebetween. The spool includes a plurality of longitudinal channels which allow water to pass from an inlet port on the housing to either first outlet or second outlet ports, or to both for as great or as little flow through second outlet port as desired. Thus, the spool can be regulated so purified water which does not exit from the second or use outlet port remains in the loop for continued purification at a flow rate of approximately 0.75 gal/min. By manually selectively turning the spool a very small quantity of purified water can be withdrawn as needed (up to 0.75 gallons/minute) for example to a faucet, while allowing any undrawn water to continue along the loop. The control valve has only a few parts and prevents stagnation which can lead to biological growth and impurity of the water.

DETAILED DESCRIPTION OF THE PREFERRED EMBODIMENTS AND OPERATION OF THE INVENTION

Figure 1:
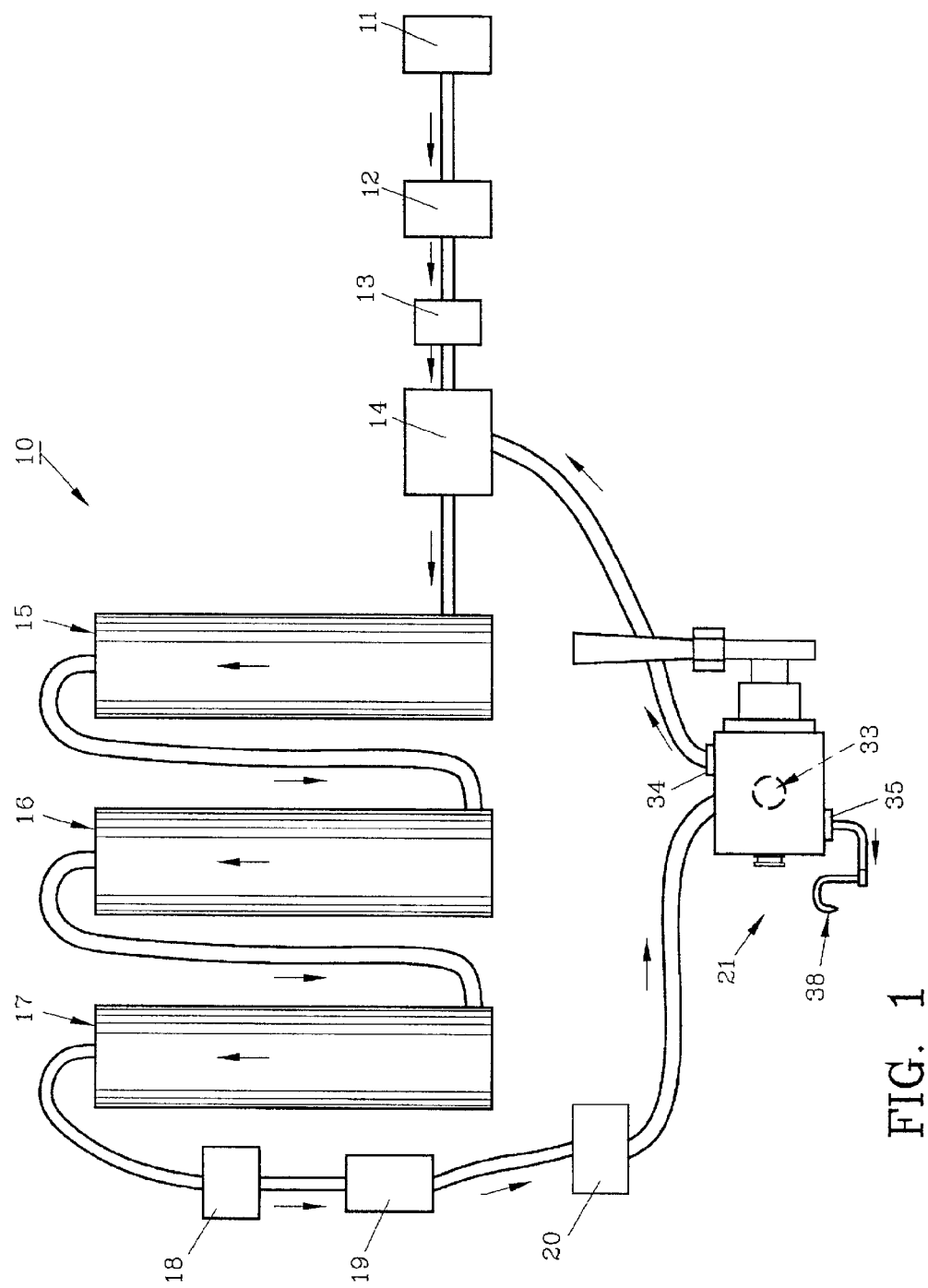
FIG. 1 illustrates a water purification loop with the control valve of the invention therein.

For a better understanding of the invention and its operation, turning now to the drawings, FIG. 1 demonstrates the preferred method of purifying water at a constant with water purification loop 10 which includes water source 11 such as from a municipal water system which furnishes potable water under pressure. The incoming water first flows to prefilter 12 and to control valve 13 which regulates the water flow and prevents water having an electrical resistance less than 500,000 ohms per centimeter from passing through pump 14. Water travels from one-way control valve 13 through pump 14 which increases the water pressure, into ultraviolet radiation chamber 15 whereby wave lengths of light in the 2500–3500 A° wavelength are thus used to kill bacteria, mold, algae, protozoa and other types of microorganisms. The ultraviolet irradiated water then passes into carbonous resin bed 16 having a carbon resin preferably such as Ambersorb XE-348 (Rohn & Haas Corporation) and on to ion exchange resin bed 17. Ion exchange resin bed 17 has preferably an anion resin type such as Amberlite 410 (Rohn & Haas) and a cation type resin such as Rohn & Haas IR-120. Other suitable resins may also be used as understood by those skilled in the water treatment art. Flow through water purification loop 10 is preferably 0.75 gal/min (2.839 l/min) although larger or smaller capacity loops may be configured as desired.

The water passes next to temperature controller 18 which maintains the radiated water at preferably about 25° C. The water next passes to polishing bed 19, also consisting of a mixture of anion and canion exchange resins as may be furnished by Rohn & Haas Company of Philadelphia, Pa. Water leaving polishing bed 19 is directed preferably through conventional conductivity meter 20 whereby the electrical resistance of the water in meg ohm/centimeters may be read. Various types of electrical resistance meters may be used as are provided by many different manufacturers. Water passing must have a minimum 18 meg ohm/ centimeters reading and if not the water flow is terminated by use of standard electrical switches (not shown).

From conventional conductivity meter 20 water thereafter passes to control valve 21 shown in more detail in FIGS. 2–5. Control valve 21 is the preferred embodiment of the control valve of the invention and includes handle 27 which is attached or molded to spool 22. Spool 22 is preferably formed from an acetal resin sold by E. I. DuPont Company of Wilmington, Del. under the mark Delrin. This Delrin polymeric material is both rigid and durable as required for this application.

Figure 2:
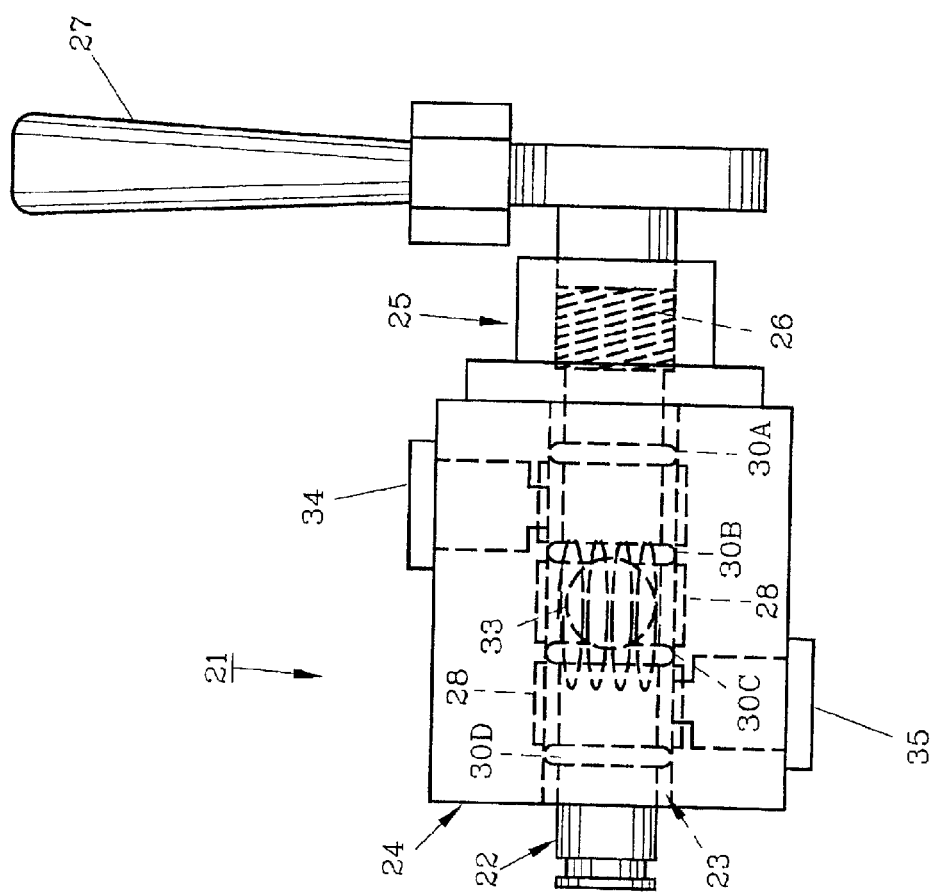
FIG. 2 shows an enlarged view of the control valve as removed from the loop.

As shown in FIG. 2, spool 22 snugly fits in duct 23 of housing 24 and is rotatable by handle 27. Housing 24 includes threaded spool cap 25 attached to housing 24 which engages threads 26 on spool 22.

Figure 3:
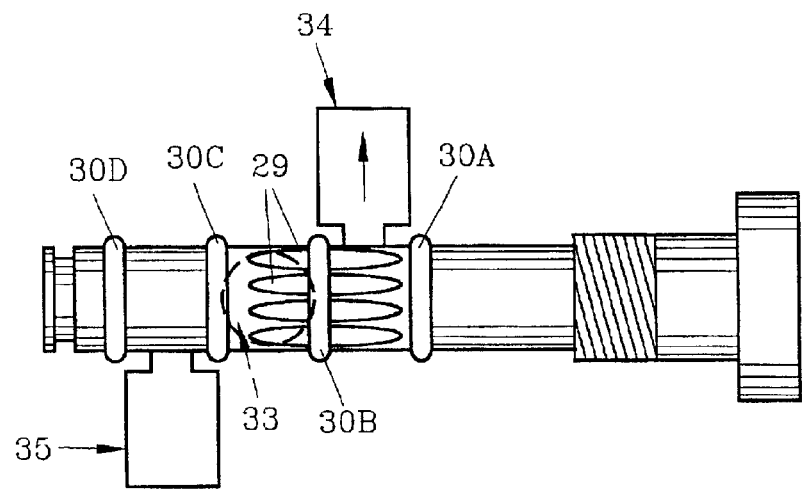
FIG. 3 demonstrates in a partial schematic fashion a first position of the spool relative to the housing inlet and exit ports.
Figure 4:
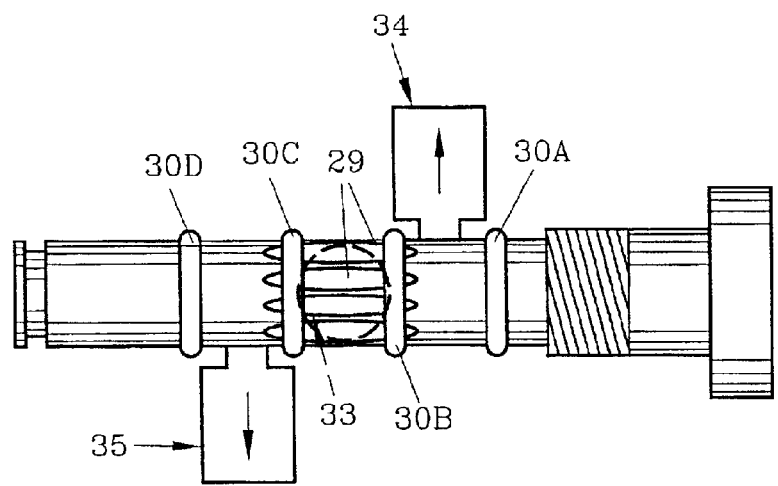
FIG. 4 features yet another partial schematic view of the spool as shown in FIG. 3.

As also shown in FIGS. 2–5, spool 22 includes a plurality of longitudinal channels 29 for conducting water therealong. O-rings 30A–D as shown in FIGS. 2–5 prevent water from passing along the outer surface of spool 22 except when channels 29 are encountered. Channels 29 allow water to flow beneath O-rings 30A–D. Thus, as shown in FIG. 3, water entering inlet port 33 will pass along channels 29 and will exit first outlet port 34, but not second outlet port 35. In FIG. 4 spool 22 has been rotated by turning handle 27 clockwise and, as channels 29 lie beneath O-rings 30B and 30C, allows water to flow both through first outlet port 34 and through second outlet port 35. As further seen in FIG. 2, grooves 28 encircle duct 23 to allow water to freely flow between O-rings 30A–D.

Figure 5:
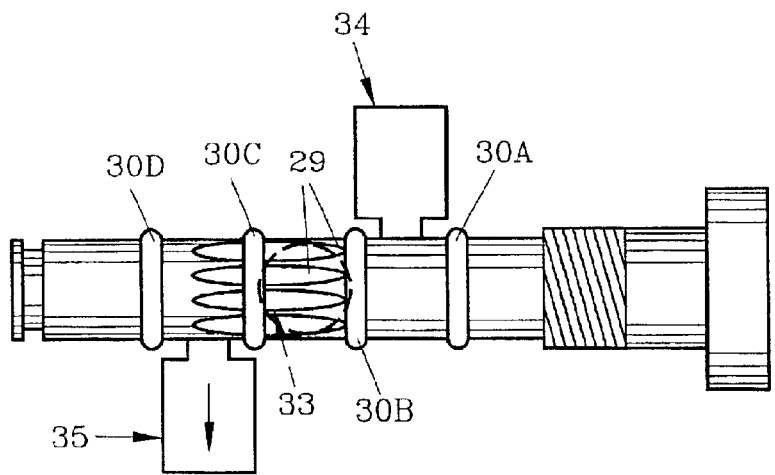
FIG. 5 depicts another partial schematic view of yet another position of the spool relative to the inlet and exit ports.

In FIG. 5, handle 27 has been rotated further in a clockwise direction urging spool 22 right to left whereby channels 29 no longer lie beneath o-rings 30B. Therefore, water flows only beneath o-ring 30C to exit second outlet port 35 to faucet 38 as shown in FIG. 1, or for some other end use. By manually rotating handle 27, the water flow can be regulated to second outlet port 35 and any excess water as shown in FIG. 4 passes through outlet 34 to maintain the preferred gal/min flow rate of 0.75 gal/min (2.839 l/min) through preferred water purification loop 10. While handle 27 is preferably manually operated, solenoid or other automated or electric components could be configured to operate spool 22.

The illustrations and examples provided herein are for illustrative purposes and are not intended to limit the scope of the appended claims.

I claim:

1. A control valve comprising; a housing, a spool, said spool rotatably contained within said housing, said housing defining a fluid entry port, a first fluid exit port and a second fluid exit port, said fluid entry and said first and second fluid exit ports in fluid communication with said spool, said spool defining a plurality of longitudinal parallel channels therealong, a plurality of o-rings, said o-rings spaced in said housing around said spool, said housing defining a duct and a plurality of parallel grooves, said grooves axially spaced to encircle said duct between said o-rings, said spool threadably mounted in said housing whereby rotating said spool in one direction will allow fluid to flow from said entry port through said channels beneath one of said o-rings to said second exit port and rotating said spool in the opposite direction will cause fluid to bypass said second exit port.

2. The control valve of claim 1 further comprising a handle, said handle attached to said spool.

3. The control valve of claim 1 wherein said spool is formed of a polymeric material.

4. The control valve of claim 3 wherein said polymeric material is an acetyl polymer.

5. The control valve of claim 1 wherein the housing is formed from a polymeric material.

6. The control valve of claim 1 wherein said entry port and said first exit port are connected to a water purification loop.

7. A control valve comprising: a housing, said housing defining a plurality of grooves, said housing defining a spool duct, said spool duct containing a plurality of o-rings, said grooves axially spaced in parallel to encircle said spool duct between said o-rings, a spool, said spool positioned in said housing in selective rotatable engagement with said o-rings, said spool defining a plurality of longitudinal channels, said channels longitudinally extending along said spool, said spool positioned within said o-rings, said housing further defining an entry port and first and second exit ports, said entry port and said exit ports communicating with said spool duct, said first and said second exit ports spaced axially along said spool duct, said spool threadably joined to said housing, said spool rotatable to allow continual flow of a liquid within said channels from said entry port to said first exit port and for selective flow of liquid to said second exit port.

8. The control valve of claim 7 wherein said spool is formed from an acetyl polymer.

9. The control valve of claim 7 wherein said housing is formed of a polymeric material.

10. The control valve of claim 7 wherein said fluid entry port and said first fluid exit port are connected to a water purification loop.

11. A method of purifying water utilizing a control valve having a housing with a duct and a rotatable spool, a plurality of o-rings mounted in the housing around the spool, a plurality of axially spaced parallel grooves defined in the housing encircling the duct and surrounding the spool, said spool defining a plurality of longitudinal channels which will allow liquid to pass beneath the o-rings during selective spool movement within said housing, said spool in fluid communication with an entry port and a pair of exit ports, said method comprising the steps of;
   a) passing water through a purification loop;
   b) directing the purified water to the control valve within the loop;
   c) circulating the purified water through the control valve;
   d) selectively rotating the spool to allow water to flow through the channels beneath the o-rings; and
   e) diverting purified water within the control valve to an end use.

12. The method of claim 11 further comprising the step of passing any undiverted water within the control valve back to the purification loop.

13. The method of claim 11 wherein rotating the spool comprises the step of manually rotating the spool.

* * * * *